(12) United States Patent
Laine

(10) Patent No.: US 8,260,580 B2
(45) Date of Patent: Sep. 4, 2012

(54) DATA ACQUISITION APPARATUS AND METHOD

(75) Inventor: Jérôme Laine, Sautron (FR)

(73) Assignee: Sercel, Carquefou (FR)

( * ) Notice: Subject to any disclaimer, the term of this patent is extended or adjusted under 35 U.S.C. 154(b) by 456 days.

(21) Appl. No.: 12/696,152

(22) Filed: Jan. 29, 2010

(65) Prior Publication Data

US 2010/0198561 A1    Aug. 5, 2010

(30) Foreign Application Priority Data

Feb. 3, 2009   (EP) ..................................... 09305102

(51) Int. Cl.
*H04L 7/00*     (2006.01)
*G06F 19/00*    (2011.01)

(52) U.S. Cl. ....................................................... 702/189
(58) Field of Classification Search ................... 702/189
See application file for complete search history.

(56) References Cited

U.S. PATENT DOCUMENTS

| | | | |
|---|---|---|---|
| 3,986,162 A | 10/1976 | Cholez et al. | |
| 4,136,326 A | 1/1979 | Naudot et al. | |
| 5,489,903 A | 2/1996 | Wilson et al. | |
| 5,512,897 A | 4/1996 | Wilson et al. | |
| 5,712,635 A | 1/1998 | Wilson et al. | |
| 6,497,149 B1 | 12/2002 | Moreau et al. | |
| 6,957,147 B2 | 10/2005 | Baliguet et al. | |
| 7,548,600 B2 | 6/2009 | Laine et al. | |
| 2004/0258188 A1* | 12/2004 | Kim et al. | 375/376 |
| 2007/0025307 A1 | 2/2007 | Menard et al. | |
| 2007/0025308 A1 | 2/2007 | Menard et al. | |
| 2007/0025365 A1 | 2/2007 | Sagot et al. | |
| 2007/0025484 A1* | 2/2007 | Laine et al. | 375/355 |
| 2010/0128564 A1 | 5/2010 | Boucard | |

FOREIGN PATENT DOCUMENTS

| | | |
|---|---|---|
| EP | 0 719 478 B | 7/1998 |
| FR | 2 747 795 A1 | 4/1996 |
| WO | WO 95/08221 | 3/1995 |
| WO | WO 95/31860 A | 11/1995 |

* cited by examiner

*Primary Examiner* — Cindy H Khuu
(74) *Attorney, Agent, or Firm* — Harness, Dickey & Pierce, P.L.C.

(57) ABSTRACT

The disclosure concerns a data acquisition apparatus and method. According to the disclosure, a first means providing a series of first digital sampled data (X) at an imperfect sampling frequency ($F_E$) provided by a local clock (2) comprises sigma-delta modulation means (3) arranged to produce said series of first digital sigma-delta modulated data (X), a second gauging means (50) for measuring the frequency error of the local clock (2) in view of a reference clock (6), a third means for correcting the first data based at least on the measured frequency error, which comprises at least an interpolation means (4) to produce second digital data (Y) based on at least an interpolation of said first series (X) and compensating the measured frequency error (FD), and at least a decimation filter (7) for producing third digital data (A) based on said second digital data (Y), are provided.

14 Claims, 5 Drawing Sheets

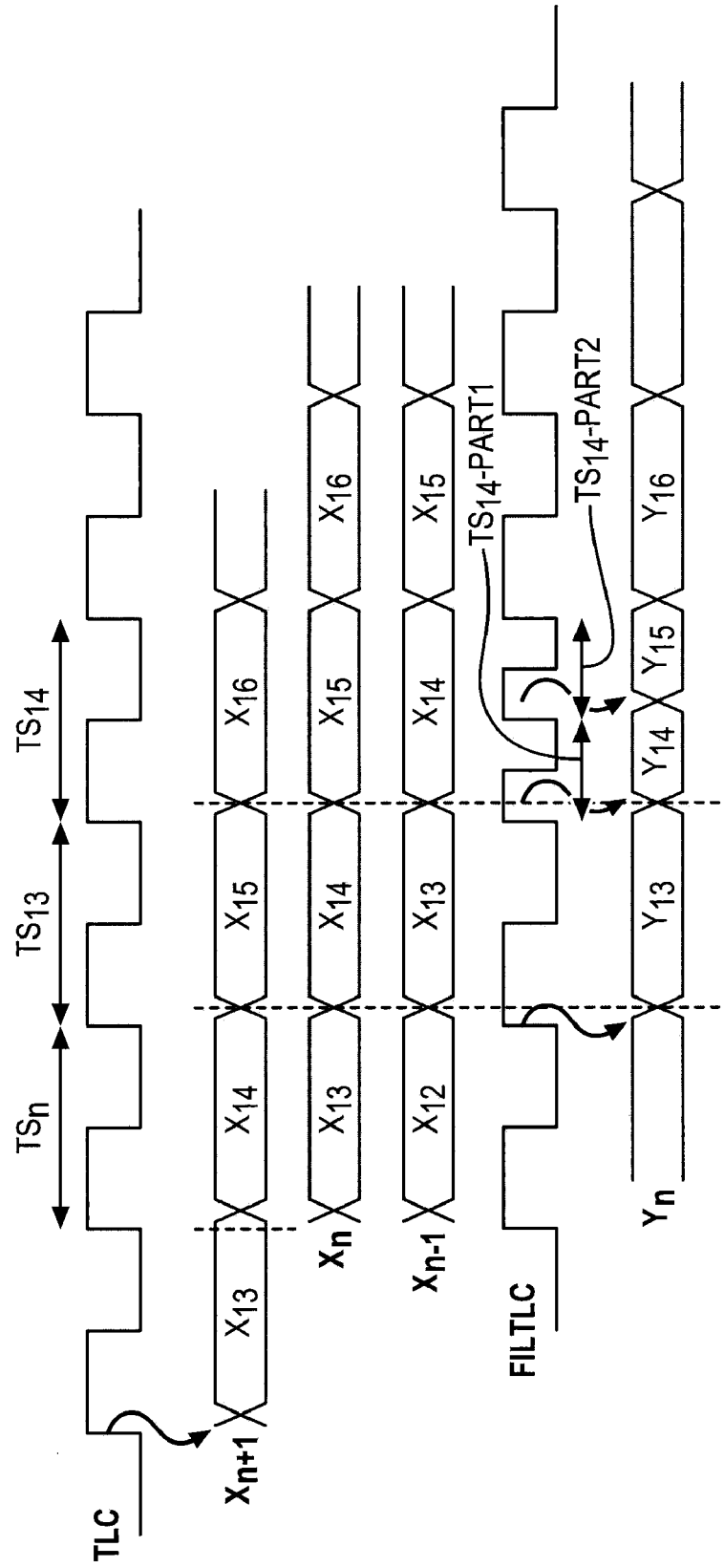

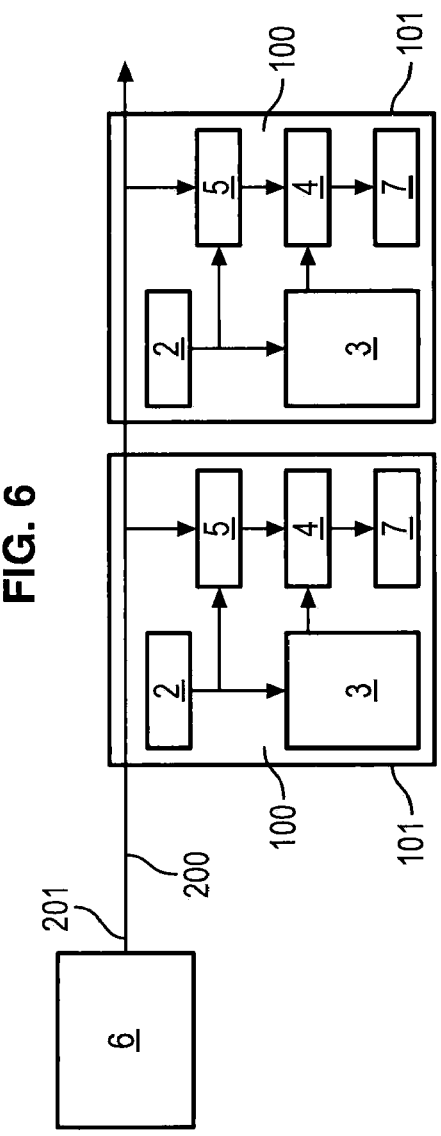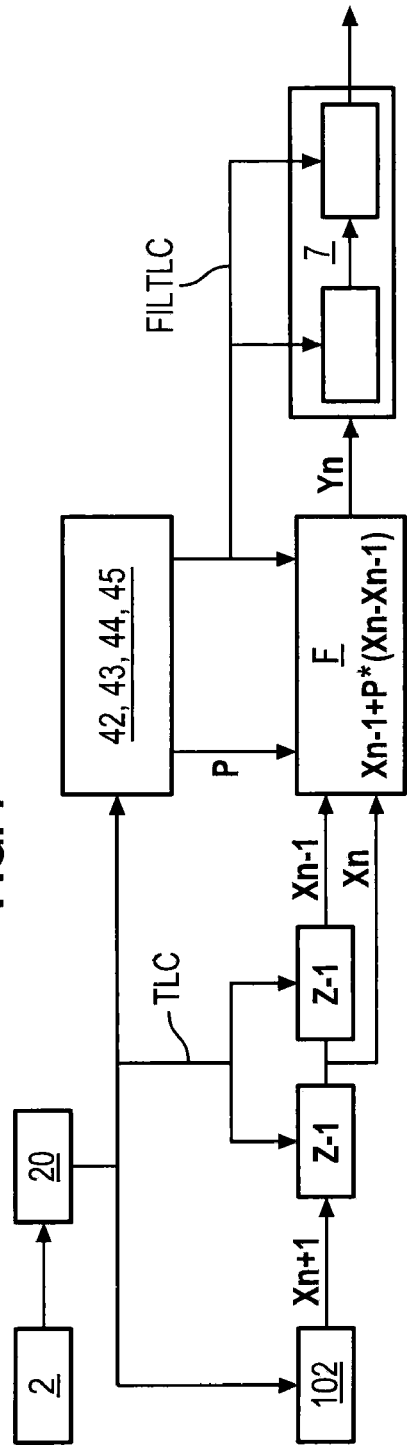

DATA ACQUISITION APPARATUS AND METHOD

CROSS-REFERENCE TO RELATED APPLICATIONS

This application claims the benefit and priority of European Application EP 09305102.7, filed on Feb. 3, 2009, which is incorporated by reference herein.

BACKGROUND AND SUMMARY

The invention relates to a data acquisition apparatus and method. The invention relates in particular to an apparatus and a method for seismic data acquisition, the apparatus being intended to form a node of a seismic sensors network. More accurately, the present invention relates to a seismic data acquisition apparatus being made up of one digital signal processing mean connected to a digital seismic sensor or to an analog seismic sensor associated with an analog/digital converter both producing a series of digital seismic samples or ground displacement measurements. All the nodes must be synchronized so that they all have the same sampling time.

A person skilled in the art will be aware of numerous data acquisition apparatuses and methods intended to be implemented within a data acquisition network. In the case where the data acquisition network is formed of an assembly of seismic sensors, these devices are conventionally and usually constituted by sensors linked together in groups, by wires or cables, to a "node" of the network. These nodes are generally organized in groups around a "concentrator", and a group of nodes forms, with its concentrator, a subnetwork, the links between the concentrator and the nodes also being wire links. The concentrators locally manage the subnetwork of nodes, provide the power supply and centralize the data. The concentrators are connected to a local computer network, likewise a wire network, to which is connected a Central Unit which drives the assembly and records the data originating from the subnetworks. These conventional solutions are well known to the person skilled in the art and will not be described in detail hereinbelow.

The person skilled in the art has also proposed wireless data acquisition networks which have the obvious advantage of avoiding the use of numerous cables. In the case of seismic applications, these networks are also formed of nodes, of concentrators and of a Central Unit according to an organization in accordance with what is described hereinabove, the communication between these various elements of the network being performed by RF in radio mode. A classical technique is to transmit to all of the nodes only one sampling reference clock. Each node extracts and maintains this sampling clock thanks to a phase-locked loop system (PLL) controlling a local oscillator. The use of a VCXO (voltage controlled crystal oscillator) controlled by a PLL has a high cost and a high energy consumption and involves strong hardware requirements for transmitting the clock.

Another data acquisition apparatus is known from document GB-2 428 799. It comprises an analog/digital converter sampling at an imperfect frequency provided by a local clock data acquired by a sensor thus providing a series of sampled and dated data, a time-stamping module for measuring the frequency error of the local clock by determining the sampling dates according to a universal time and comprising: a satellite-based positioning system including a reference clock, the time-stamping module being able to gauge the local clock to the reference clock of the satellite-based positioning system, means for turning off the satellite-based positioning system once the gauging of the local clock has been performed, a resampling module for correcting the sampled and dated data. The resampling module is able to generate, on the basis of a series of the sampled and dated data, a series of resampled and redated data, that is to say in which the phase error and sampling frequency error of the series of data are both compensated. The resampling module comprises a first memory storing the series of data dated and sampled at a frequency corresponding to the frequency of the local clock, and a second memory storing the sampling dates determined according to the universal time. The resampling module comprises a resampler linked on the one hand to a first memory containing the series of sampled and dated data and linked on the other hand to an interpolation filter, said interpolation filter itself being linked to a second memory containing the sampling dates determined according to the universal time and linked also to a reference filter through which the interpolation filter is dynamically calculated for each sample of a series of samples to be calculated, said interpolation filter thus generating the corrective interpolation coefficients making it possible to generate the series of resampled data within the resampler.

Said known apparatus has revealed to be difficult and expensive to be made in practice. It has the disadvantage of requiring a high computing load. The interpolation filter has a high degree i.e. a high number of coefficients and has to be recalculated for each sample. It involves a strong constraint in memory size, a high number of calculations in the short time allowed by the time elapsed between successive samples, and thus a high consumption in energy.

An objective of the present invention is therefore to propose an apparatus and a method to alleviate the above-mentioned inconvenience of the state of the art. Another objective of the present invention is to propose an apparatus and a method making it possible to obtain accurate acquisition data while minimizing energy consumption, computing load and memory load.

These objectives are achieved within the framework of the present invention by virtue of a data acquisition apparatus, comprising:

- a first means providing a series of first digital sampled and dated data (X) at an imperfect sampling frequency ($F_E$) provided by a first local clock (2),
- a second gauging means (50) for measuring the frequency error of the first local clock (2) in view of a second reference clock (6),
- a third means for correcting the first data based at least on the measured frequency error,
- characterized in that
- the first means (3) comprises sigma-delta modulation means (3) arranged to produce said series of first digital sigma-delta modulated data (X) sampled at said first imperfect sampling frequency ($F_E$) provided by said first local clock (2),
- the third means comprises at least an interpolation means (4) to produce second digital data (Y) based on at least an interpolation of said first series of data samples (X) and compensating the measured frequency error (FD), and at least a decimation filter (7) for producing third digital data (A) based on said second digital data (Y).

According to an embodiment of the invention, the first means comprises at least an analog sensor (102) producing analog measurement data and the sigma-delta modulation means (3) is in the form of a sigma-delta analog—digital converter (3) converting said analog measurement data of the sensor (102) into said series of first digital sigma-delta modulated data (X). According to an embodiment of the invention, the first means comprises at least a digital sensor having said sigma-delta modulation means for producing said series of first digital sigma-delta modulated data (X). According to an embodiment of the invention, the apparatus comprises a control means (42) arranged to set said interpolation based on at least said measured frequency error (FD). According to an embodiment of the invention, the interpolation means (4) has an interpolation function (F) having a preset fixed degree and at least a parameter ($C_0, C_1, C_2$), the third control means (42) comprises a means arranged to set said parameter ($C_0, C_1, C_2$) of the interpolation function (F) based on at least said measured frequency error (FD). According to an embodiment of the invention, the degree of the interpolation function (F) is lower than six.

According to an embodiment of the invention, the interpolation function (F) is linear and the control means (42) sets the interpolation function (F) according to interpolation formula for current first sample $X_n$:

$$Y_n = C_0 \cdot X_n \cdot C_1 \cdot X_{n-1},$$

wherein
$C_0 = P_n$
$C_1 = 1 - P_n$
wherein $X_{n-1}$ and $X_n$ are respectively successive first samples (X),
$Y_n$ is the interpolated third data (Y) for $X_{n-1}$ and $X_n$,
wherein the control means (42) calculates the value Pn of an interpolation coefficient (P) according to formula:

$$P_n = P_{n-1} + FD$$

wherein $P_{n-1}$ and $P_n$ are respectively successive values of the interpolation coefficient P and FD is the frequency drift.

According to an embodiment of the invention, the interpolation function (F) has a degree equal to two and the control means (42) sets the interpolation function (F) according to interpolation formula for current first sample $X_n$:

$$Y_n = C_0 \cdot X_n + C_1 \cdot X_{n-1} + C_2 \cdot X_{n-2},$$

wherein $$C_0 = \frac{1}{2} P_n^2 - \frac{1}{2} P_n + \frac{1}{8}$$

$$C_1 = \frac{3}{4} - P_n^2$$

$$C_2 = \frac{1}{2} P_n^2 + \frac{1}{2} P_n + \frac{1}{8}$$

wherein $X_{n-2}$, $X_{n-1}$ and $X_n$ are respectively successive first samples (X),
$Y_n$ is the interpolated third data (Y) for $X_{n-2}$, $X_{n-1}$ and $X_n$,
wherein the third control means (42) calculates the value $P_n$ of an interpolation coefficient (P) according to formula:

$$P_n = P_{n-1} + FD$$

wherein $P_{n-1}$ and $P_n$ are respectively successive values of the interpolation coefficient P and FD is the frequency drift.

According to an embodiment of the invention, the control means (42) comprises a means (43, 44) to check whether according to formula $P_n = P_{n-1} + FD$ the value $P_n$ of the interpolation coefficient (P) is higher than or equal to zero and lower or equal to one, and as long as the interpolation coefficient is higher than or equal to zero and is lower or equal to one, the control means (42) sets the interpolation function (F) according to interpolation formula for $X_n$ with the value $P_n$ of the interpolation coefficient (P). According to an embodiment of the invention, the control means (42) comprises a means (44) to check whether according to formula $P_n = P_{n-1} + FD$ the value $P_n$ of the interpolation coefficient (P) is higher than one for current first sample $X_n$, and if according to formula $P_n = P_{n-1} + FD$ the value $P_n$ of the interpolation coefficient (P) calculated for current first sample $X_n$ is higher than one, then the control means (42) does not use the corresponding interpolated value $Y_n$ calculated according to interpolation formula as third data (Y) for current first sample $X_n$ with $P_n = P_{n-1} + FD$, but produces as third data associated with current first sample $X_n$ a value $Y_n$ calculated according to interpolation formula for current first sample $X_n$ with the value $P_n$ of the interpolation coefficient calculated according to $P_n = P_{n-1} + FD - 1$.

According to an embodiment of the invention, the control means (42) comprises a forecast means (43) to check whether according to formula $P_{n+1} = P_n + FD$ the next value $P_{n+1}$ of the interpolation coefficient (P) for current first sample $X_n$ is lower than zero, and if according to formula $P_n = P_{n-1} + FD$ the value $P_n$ of the interpolation coefficient (P) calculated for current first sample $X_n$ is lower than zero, then the control means (42) produces as third data (Y) the corresponding interpolated value $Y_n$ calculated according to interpolation formula for current first sample $X_n$ with $P_n = P_{n-1} + FD$ and produces as third data (Y) another value calculated according to interpolation formula for current first sample $X_n$ with the value $P_n$ of the interpolation coefficient calculated according to $P_n = P_{n-1} + FD + 1$. According to an embodiment of the invention, said series of first digital sigma-delta modulated data (X) has a first preset bit resolution (BR1) of at least one and of lower or equal to four, the second data (Y) has said first sampling frequency ($F_E$) and a second preset bit resolution (BR2) higher than the first bit resolution (BR1), and the third digital data (A) has a third preset sampling frequency ($F_3$) lower than the first sampling frequency ($F_E$) and a third preset bit resolution (BR3) higher than the first bit resolution (BR1). According to an embodiment of the invention, the value of the first local clock frequency $F_E$ is preset to cause an oversampling of the signal provided by at least a sensor according to an oversampling rate OR higher than one, wherein the oversampling rate OR is defined as being equal to:

$$OR = F_E / 2 \cdot F_U.$$

wherein $F_U$ is the highest useful frequency of said signal provided by said sensor.

These objectives are achieved within the framework of the present invention also by virtue of a data acquisition method carried out by calculation means, comprising the steps of:
providing a series of first digital sampled and dated data (X) at an imperfect sampling frequency ($F_E$) provided by a first local clock (2),
measuring the frequency error of the first local clock (100) in view of a second reference clock (6) by gauging the first local clock (100) in view of the second reference clock (6),
correcting the first data based at least on the measured frequency error,
characterized in that
said series of first digital sigma-delta modulated data (X) sampled at said first imperfect sampling frequency ($F_E$) provided by said first local clock (2) is produced by a sigma-delta modulation (3),
said series of first digital sigma-delta modulated data (X) is interpolated to produce second digital data (Y) in order to compensate the measured frequency error (FD), said second digital data (Y) is decimated for producing third digital data (A).

BRIEF DESCRIPTION OF THE FIGURES

Other characteristics, aims and advantages of the present invention will become apparent on reading the detailed description which follows, and in conjunction with the appended drawings, given by way of non limiting examples and in which:

FIG. 5 shows a chronogram of the data pipeline during the interpolation according to the invention in a second case;

FIG. 6 shows a block diagram of a system having a plurality of data acquisition apparatus according to the invention; and FIG. 7 shows an embodiment of the data acquisition apparatus according to the invention.

DETAILED DESCRIPTION

The invention is described hereunder in case of one or several analog sensor 102 producing analog measurement data. Examples of analog sensors are geophones, translation sensors, speed sensors, accelerometers, pressure sensors. Of course, the invention also applies to one or several sensor 102 producing digital measurement data.

Figure 1:
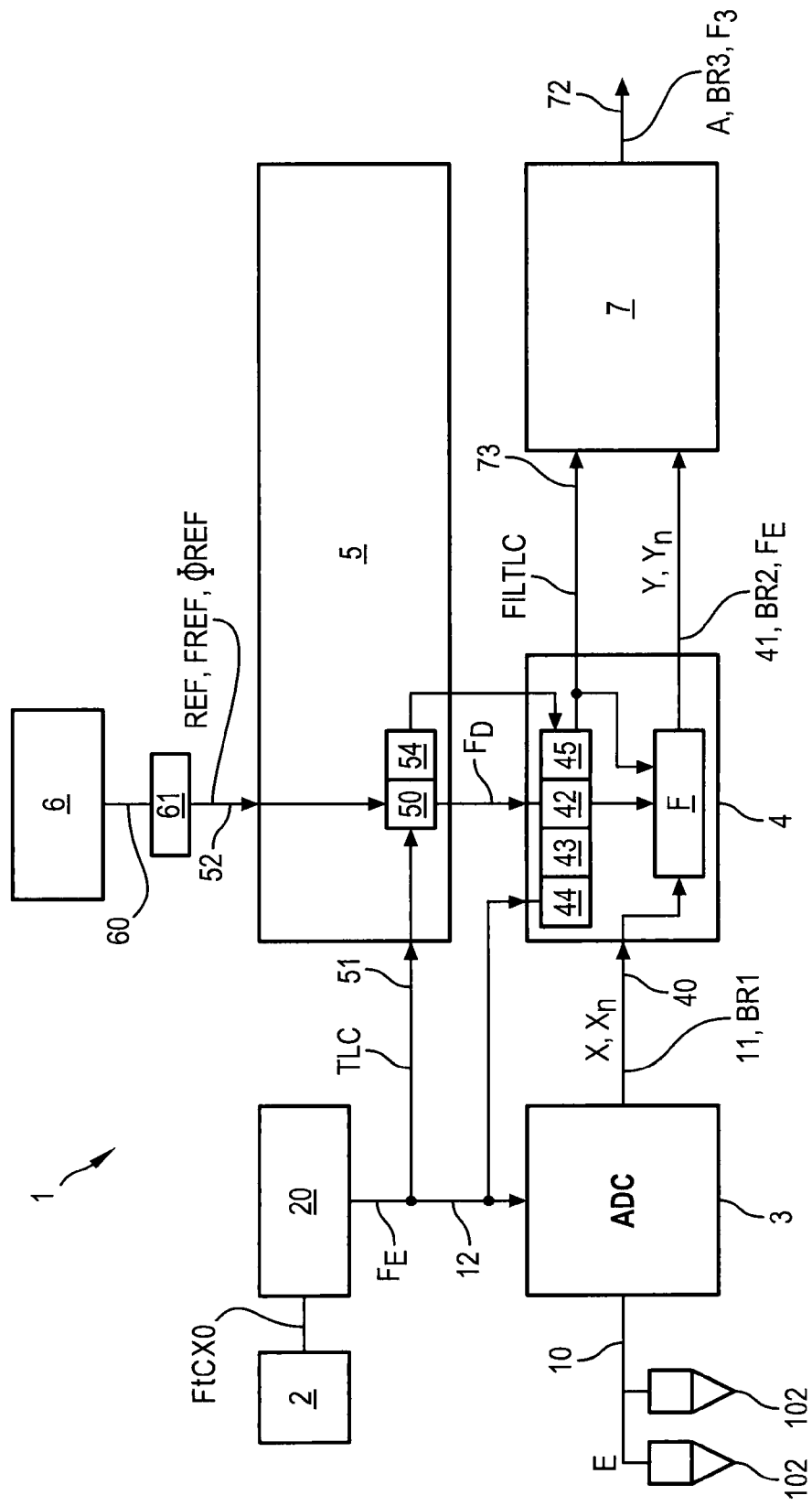
FIG. 1 shows a block diagram of an embodiment of the data acquisition apparatus according to the invention.

On FIG. 1, the apparatus 1 is dedicated to the acquisition of seismic analog data measured by at least a sensor 102 and sent to a first analog data input 10. The apparatus 1 comprises a first local clock 2, formed for example by a TCXO oscillator (temperature compensated crystal oscillator), and an analog-digital converter 3 for converting the analog data E present on the first analog data input 10 into first digital data samples X on its converter output 11. The first digital data samples X has a first bit resolution BR1. The converter 3 has a second frequency input 12 connected to the first local clock 2. The frequency of the first digital data samples X generated by the converter 3 is set by the second frequency input 12. The first data samples X are in the form of a bitstream.

The value of the local clock frequency $F_E$ on input 12 is preset to cause an oversampling of the analog data input 10 by the converter 3. An oversampling rate OR is defined as being equal to:

$$OR = F_E / 2 \cdot F_U.$$

wherein $F_U$ is the highest useful frequency of the signal of input 10. The sampling frequency $F_E$ is higher than $2 \cdot F_U$, which means
OR>1.
For example,
$F_E > 128 \cdot F_U$
OR>64.

A frequency adapter 20 may be inserted between the local clock 2 and the second frequency input 12, in order to adapt the frequency of the signal provided by the local clock 2 to the desired frequency $F_E$ on the second frequency input 12. For example, the frequency adapter 20 may have a frequency divider to divide the frequency Ftcxo of clock 2 into frequency $F_E$ on the second frequency input 12, in case frequency $F_E$ is lower than the frequency Ftcxo of clock 2. In an example, the local clock 2 produces a signal having a frequency Ftcxo of several MHz, like 8 Mhz, and $F_E$=256 kHz.

The analog-digital converter 3 providing an oversampling comprises a sigma-delta modulator. In this case, it is an analog-digital sigma-delta converter 3. The operating and structure of a sigma-delta converter are known to the person skilled in the art and will not be described in detail hereinbelow. It is an oversampling converter producing on its output OUT, 11 a signal having a one bit resolution BR1.

Figure 2:
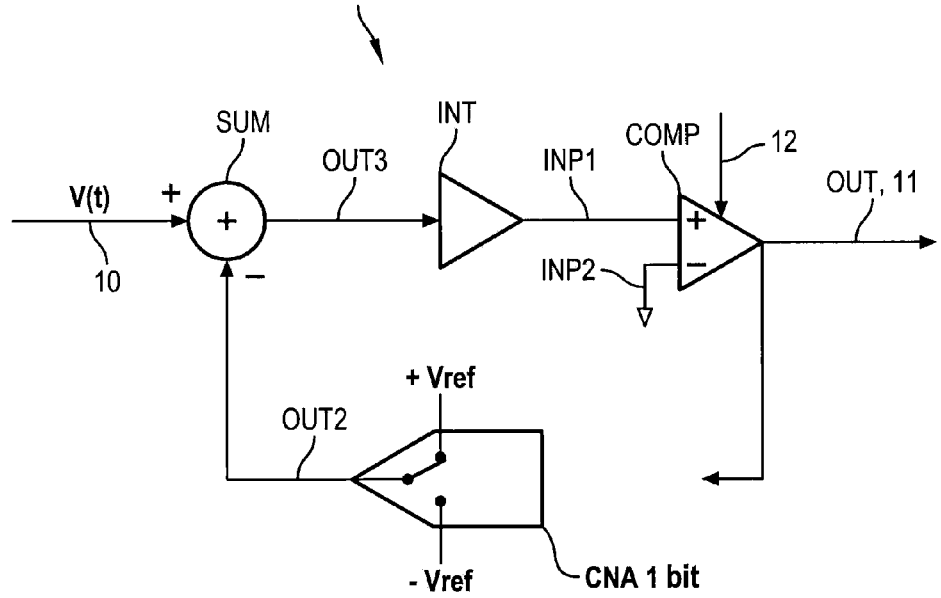
FIG. 2 shows a block diagram of an example for a sigma-delta converter which can be used in the data acquisition apparatus according to the invention.

As a matter of non-limiting example on FIG. 2, the sigma-delta converter 3 has mainly an integrator INT whose output is connected to a first input INP1 of a comparator COMP and whose input is connected to the output OUT3 of a subtracter or summer SUM having a plus input and a minus input, which is the so-called sigma element adding the two plus and minus inputs. The comparator COMP is used to convert the difference between the first input INP1 and a second input INP2 having a preset fixed value into a one bit output OUT, which is the so-called delta output, i.e. it provides on the comparator output OUT a bit 1 when the first input INP1 is higher than the second output INP2 and a bit 0 in the contrary case. The periodic time slot dedicated for each bit of the comparator output OUT is set by the frequency imposed by the frequency input 12. The comparator output OUT is fed back to the minus input of the subtracter SUM through a digital-analog converter CNA. The converter CNA produces on its output OUT2 connected to the minus input a +Vref signal for a bit 1 and a −Vref signal for a bit 0, wherein Vref is a fixed value different from zero. The plus input of the subtracter SUM is connected to the analog input 10 receiving the analog signal V(t). Consequently, the summer SUM supplies on its output OUT3 the difference between the analog input V(t) and the converter CNA output OUT2, which is OUT3=V(t)−OUT2. When at the comparator COMP, the signal of the input INP1 is higher than the signal of the input INP2, the comparator output OUT becomes a bit 1 and will cause the digital-analog converter CNA to output a +Vref signal on OUT2. Due to the minus sign of the summer input connected to the digital-analog converter output OUT2, the summer SUM will produce a signal OUT3 causing the input INP1 to lower through the integrator INT, until the input INP1 goes under the input INP2. When V(t)>OUT2, the integrator INT will integrate positively to force OUT2 to be closer to V(t). When V(t)<OUT2, OUT2 will be lowered by applying a negative signal to the integrator INT input. Thus, the higher the analog input signal V(t) is, more numerous the bits 1 will be on the converter output OUT, 11. The mean value of the output OUT, 11 represents the mean value of the input signal V(t).

In case of a digital sensor 102 producing digital measurement data, the sensor produces on an output 11 said digital data X, which is sigma-delta modulated in the sensor 102. Consequently, the housing of the digital sensor 102 incorporates a sigma-delta modulator producing said digital data X. An example of a digital sensor 102 is a digital accelerometer. Of course, the output OUT, 11 could have more than one bit, and for example one to four bits. The invention is described hereunder in case of an analog-digital sigma-delta converter 3 producing first one bit data samples X.

The sigma-delta converter output 11 is connected to the data input 40 of an interpolation means 4, in order to transmit the first one bit data samples X to data input 40. The interpolation means 4 is for example in the form of an interpolation filter. The interpolation means 4 contains a means to produce on an interpolation output 41 second data Y having said first sampling frequency $F_E$ and a second preset bit resolution BR2 higher than the first bit resolution BR1. The second data Y on interpolation output 41 is calculated through an interpolation function of the first one bit data samples X of data input 40. $X_{n-1}$, $X_n$ designate the successive one bit data samples of X at respective times T and $T_{n-1}$, wherein n−1 and n designate the successive numbers of the data samples at rate $F_E$. $Y_n$, $Y_{n-1}$ designate the successive data samples of Y, wherein n−1 and n designate the successive numbers of the data samples. Consequently, $$T_n = T_{n-1} + 1/F_E.$$

In the interpolation means 4, the interpolation function F is calculated for each of the second data Y by a calculation means 42 using the frequency drift FD of the local clock 2. The interpolation function F has a preset fixed degree. The interpolation means 4 may be embodied by a FIR filter.

The frequency drift or frequency error FD is calculated by a calculation means 50 of a control module 5 having a first frequency input 51 connected to the local clock 2 for receiving the first imperfect periodic clock signal TLC supplied by said local clock 2 having frequency $F_E$, and a second frequency input 52 connected to a reference clock input 60 for receiving a periodic reference clock signal REF. For example, the reference clock signal REF is provided by a reference means 6 supplying a reference clock which is for example a satellite-based positioning system. The periodic clock signal TLC is represented by pulses or fronts or another signal pattern, called generally periodic time pattern repeating at frequency $F_E$ and able to be detected. The periodic reference clock signal REF is represented by pulses or fronts or another signal pattern, or square signals called generally periodic time pattern repeating at a frequency FREF, which may be equal to or different from frequency $F_E$ and which is also able to be detected. The reference clock signal REF is sent from the reference clock 6 to the second frequency input 52 through a transmission means 61 having for example cables. The reference means 6 is used as a synchronization source supplying time-stamped signal TLC, which are pulses.

An embodiment of the calculation means 50 is described hereunder. The reference means 6 supplies a reference frequency FREF and a reference phase φREF, which is the phase of the time-stamped pulses in view of the universal time coordinated (UTC). FREF is lower than $F_E$, which is lower than the frequency $F_2$ of the local clock 2:

$$FREF << F_E << F_2$$

The reference phase φREF corresponds to the travel time of the reference clock signal REF through the transmission means from the reference clock 6 to input 52. φref can be different from node to node depending on its position to the synchronization source (cable length and number of repeaters in between). This traveling time is measured before the start of the acquisition.

The calculation means 50 measures frequency $F_E$ based on reference frequency FREF. For example, in order to measure $F_E$, the number NFE of periods of $F_E$ during the time interval defined by a number NFREF of periods of FREF is counted by a counter. Then $F_E$ is obtained by:

$$F_E = FREF \cdot NFE/NFREF$$

Then, the frequency drift FD is obtained based on the measured frequency $F_E$ by $$FD = (F_E - F_{E-SET})/F_{E-SET}$$

wherein $F_{E-SET}$ is a fixed and stored setting value of frequency for $F_E$.

FD represents the measured frequency error of the local clock 2.

The calculation means 50 measures the frequency drift FD of the local clock 2. FD is expressed as a percentage value of actual TCXO frequency compared to typical value. The frequency drift FD is expressed in parts per million (ppm). Means are provided to compensate the frequency drift FD, as described below.

The interpolation function F of the interpolation means 4 is set for each input sample X in dependency of an interpolation coefficient P. Said interpolation coefficient P has successive values $P_{n-1}$, $P_n$. The interpolation coefficient $P_n$ varies for each sample $X_n$ and is directly dependent on the frequency drift FD.

$$0 \leq P \leq 1$$

In a first embodiment, the interpolation function F is linear:

$$Y_n = X_{n-1} + P_n \cdot (X_n - X_{n-1})$$

which has the following transfer function:

$$\frac{Y_n}{X_n} = P_n + (1 - P_n) \cdot Z^{-1}$$

wherein, $Z^{-1}$ represents one time slot $TS_n$ for one sample $X_n$. So the interpolation function F has two parameters:
$C_0 = P_n$ for $X_n$
$C_1 = 1 - P_n$ for $X_{n-1}$. So the first order (linear) interpolation function can be seen as a digital filter with 2 coefficients $C_0$, $C_1$.

For each sample $X_n$, the coefficient $P_n$ is incremented by FD. So for each sample $X_n$, the interpolation coefficient $P_n$ is incremented by the same value of the frequency drift FD having been calculated for successive samples $X_n$. The value $P_n$ of the interpolation coefficient P is calculated according to formula:

$$P_n = P_{n-1} + FD$$

wherein $P_{n-1}$ is the value of the interpolation coefficient P for the preceding sample $X_{n-1}$.

The control module 5 comprises also a means 54 to initialize the interpolation coefficient P. The phase error φ$F_E$ of $F_E$ is measured by the means 54. In the embodiment shown, the phase error φ$F_E$ of $F_E$ is measured by counting the number Ntcxo of periods of the signal Ftcxo of the local clock 2 during the time defined between a leading edge of an $F_E$ pulse and a leading edge of an FREF pulse, according to the following formula:

$$\phi F_E = Ntcxo \cdot 1/Ftcxo + \phi REF$$

The interpolation coefficient P is initialized by the means 54 to an initial value $P_0$ for initial time T0. At the start of the acquisition $T_0 = 0$, P is initialized to $$P_0 = modulus(\phi F_E / T_E)$$

wherein the modulus means the remainder of φ$F_E$ after division by $T_E$, and $$T_E = 1/F_E$$

For example, for φ$F_E$=3.4 μs and $F_E$=1 μs, $P_0$=0.4 μs.

Figure 3:
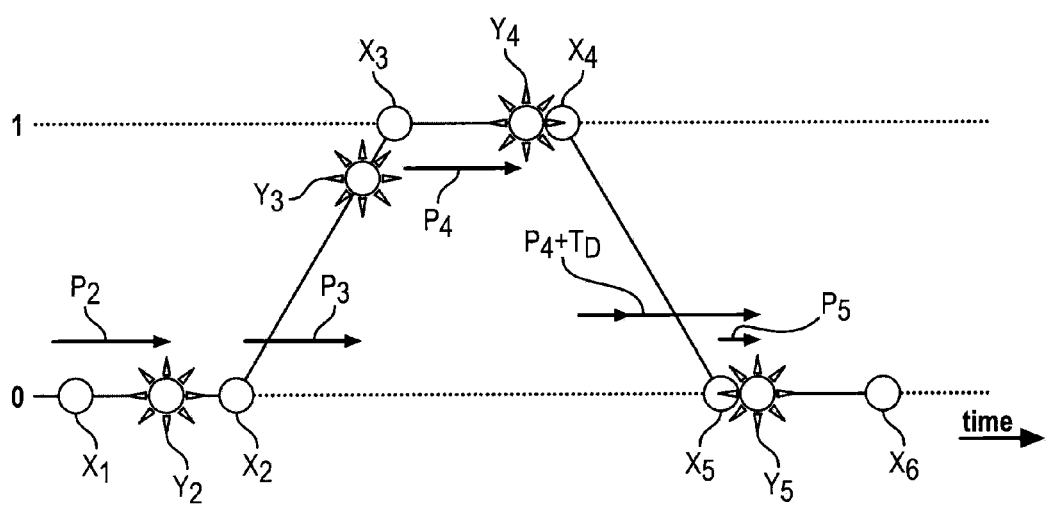
FIG. 3 shows an example of a chronogram of interpolated data according to the invention.

Contrary to usual recommendations in digital signal processing, which in practice forbid linear interpolation because of too many faults generated thereby, these faults become negligible due to the converter 3 having a high oversampling. FIGS. 3 and 7 show an interpolation made by the linear interpolation means of the first embodiment for the first one bit data samples X having as an example the following successive samples:

X1=0,
X2=0,
X3=1,
X4=1,
X5=0,
X6=0.

Figure 4:
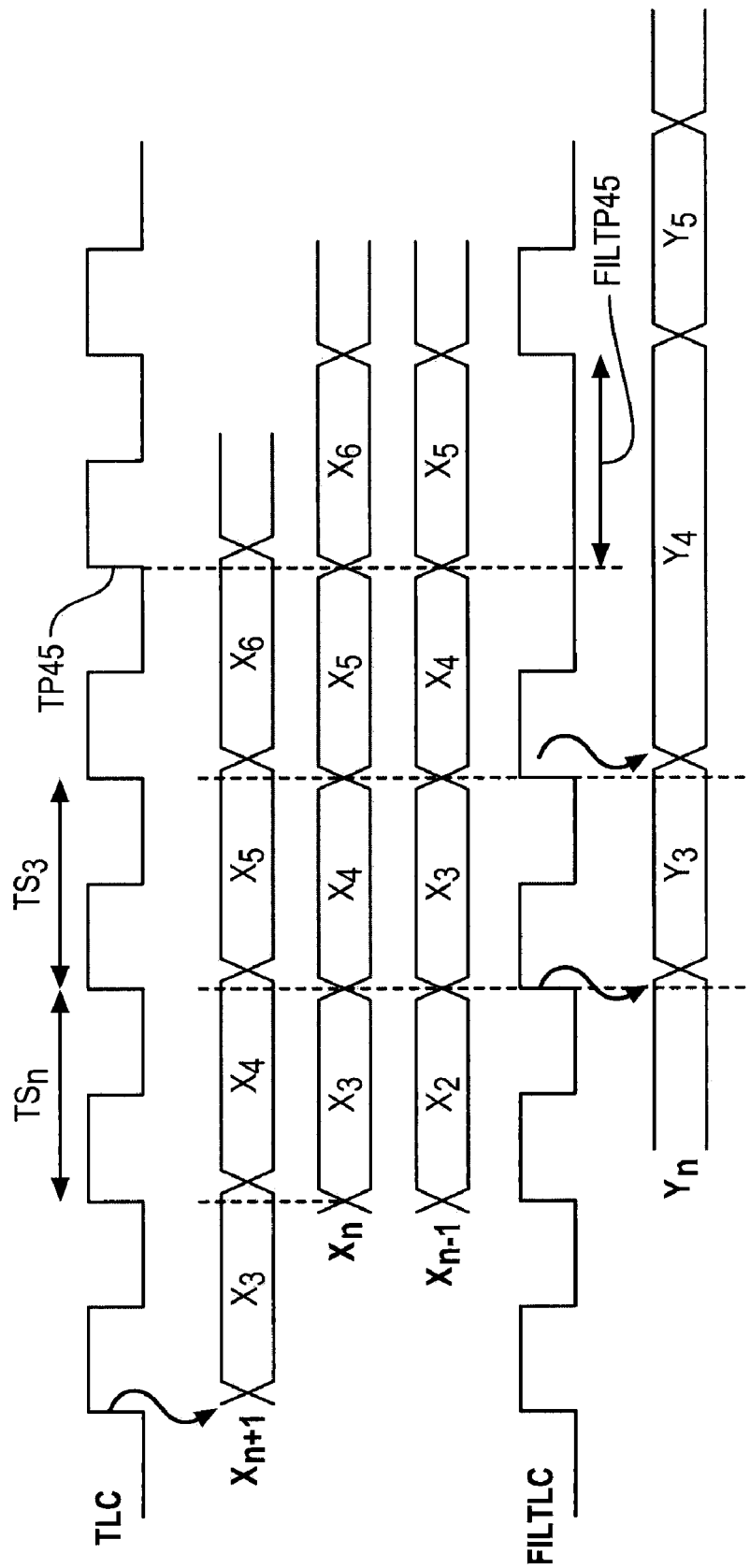
FIG. 4 shows a chronogram of the data pipeline during the interpolation according to the invention in a first case.

The FIG. 4 shows corresponding chronograms of the corresponding signals $X_n$, $X_{n+1}$, $Y_n$, TLC and a further explained signal FILTLC, in the case where the interpolation coefficient becomes higher than one, which corresponds to the case where the local clock of data acquisition apparatus is too quick. The periodic time pattern repeating at frequency $F_E$ in the local clock signal TLC is a front edge. The linear interpolation produces the following successive second data Y.

$Y_2$ is interpolated based on $X_1$, $X_2$ and $P_2$ for n=2, then $Y_2$=0.
$Y_3$ is interpolated based on $X_2$, $X_3$ and $P_3$ for n=3 with $P_3$=$P_2$+FD.
For example, $P_3$=0.96 and FD=0.03, then $P_4$=0.99 and $Y_4$=0.01 $X_3$+0.99$X_4$.
$Y_4$ is interpolated based on $X_3$, $X_4$ and $P_4$ for n=4 with $P_4$=$P_3$+FD.
$P_3$=0.96 and FD=0.03, then $P_4$=0.99 and $Y_4$=0.01$X_3$+0.99$X_4$.

Assuming that the calculated value of frequency drift FD is positive and not null, then P is growing with each further sample X. $P_3$ and $P_4$ are already close to one (and lower than one). A means 44 is provided to check whether the interpolation factor P is higher than one.

If on FIG. 3, the calculated interpolation factor P5 is higher than one, as supplied by the means 44, i.e.:

$$P_5 = P_4 + FD > 1,$$

then the corresponding interpolated value $Y_5$=$X_4$+$P_5$·($X_5$−$X_4$) is not used in second data Y for X4 and X5.
For n=5, P4=0.99 and FD=0.03, then P5=P4+FD=1.02 and Y5=(1−P5)X4+P5X5=−0.02 X4+1.02 X5 are not used.
A means 45 is provided to filter the clock signal TLC to produce a filtered signal FILTLC equal to TLC except in case where the interpolation coefficient is lower than zero or higher than one, as explained hereunder.

As shown on FIG. 4, the filtered signal FILTLC is equal to the periodic clock signal TLC of the local clock 2 except in the time slot FILTP45 allocated for $X_4$ and $X_5$, in which the periodic time pattern TP45 (front edge) of TLC is cancelled. Then, in view of the time slot FILTP45 in the filtered signal FILTLC, the time slot for $Y_4$ lasts two time slots $TS_n$ of the clock signal TLC, whereas the time slot $TS_n$ for each of $Y_2$, $Y_3$, $Y_4$ lasted only one time slot of the clock signal TLC. The $Y_5$ interpolated with a wrong interpolation coefficient $P_5$ (i.e. $P_5$>1) is replaced by the preceding interpolated third data for which $0 \leq P_5 \leq 1$.

Then $Y_5$ is delayed of one clock time slot $TS_n$ and recalculated based on the next $X_n$=$X_6$ and on the next $X_{n-1}$=$X_5$ for their next time slot. In this case, one is subtracted from the wrong interpolation factor $P_5$=$P_4$+FD higher than one and becomes then $P_5$=$P_4$+FD−1. In the interpolation formula $Y_n$=$X_{n-1}$+$P_n$·($X_n$−$X_{n-1}$), it means that $X_n$ is replaced by the next $X_{n+1}$ and $X_{n-1}$ is replaced by the next $X_n$.
Then $Y_5$=$P_5$ $X_6$+$P_5$ (1−$X_5$) with $P_5$=$P_4$+FD−1.
$P_4$=0.99 and FD=0.03, then $P_5$=0.02 and $Y_5$=0.02 $X_6$+0.98 $X_5$.

Then, as long as $0 \leq P_n \leq 1$, the next $Y_n$ are calculated with the interpolation formula $Y_n$=$X_{n-1}$+$P_n$·($X_n$−$X_{n-1}$) applied to $X_n$=$X_{n+1}$ and to $X_{n-1}$=$X_n$ with $P_n$=$P_{n-1}$+FD.

The FIG. 5 shows corresponding chronograms of the corresponding signals $X_n$, $X_{n+1}$, $Y_n$, TLC and FILTLC, in the case where the interpolation coefficient becomes lower than zero because of a negative calculated frequency drift FD, which corresponds to the case where the local clock 2 of the data acquisition apparatus is too slow. Assuming that for $Y_{13}$, the interpolation coefficient $P_{13}$ meets the requirement $0 \leq P_{13} \leq 1$, the calculation of $Y_{13}$ is carried out using the interpolation formula $Y_{13}$=(1−$P_{13}$)$X_{12}$+$P_{13}X_{13}$.
For example, $P_{13}$=0.04 and FD=−0.03.
Then $P_{14}$=0.01 and $Y_{14}$=(1−$P_{14}$)$X_{13}$+$P_{14}X_{14}$=0.99$X_{13}$+0.01 $X_{14}$.
It is assumed on FIG. 4 that $P_{15}$ becomes lower than zero, i.e. $P_{15}$=$P_{14}$+<0.

A forecast means 43 is provided to check at each clock time slot $TS_n$ of TLC whether the interpolation coefficient $P_{n+1}$ calculated for the next time slot $TS_{n+1}$ according to the formula $P_{n+1}$=$P_n$+FD is lower than zero. So the forecast means calculates during time slot $TS_n$ the interpolation coefficient $P_{n+1}$ available for the next time slot $TS_{n+1}$.

If yes is supplied by the forecast means 43, i.e. $P_{15}$=−0.02<0 for time slot $TS_{14}$ of TLC, then the clock filtering means divides said time slot $TS_{14}$ of TLC into a first partial time slot $TS_{14}$-PART1 in the filtered clock signal FILTLC and a second partial time slot $TS_{14}$-PART2 in the filtered clock signal FILTLC, for example amounting each a half of $TS_{14}$. For the first partial time slot $TS_{14}$-PART1, data $Y_{14}$ calculated as mentioned above is kept. For the second partial time slot $TS_{14}$-PART2, data $Y_{14}$ is not kept and a new data $Y_{15}$ is calculated based on the interpolation formula $Y_n$=$X_{n-1}$+$P_n$·($X_n$−$X_{n-1}$) applied to a new interpolation coefficient $P_{n+1bis}$=$P_{15bis}$=$P_{15}$+1, $X_n$ replaced by $X_{n+1}$ and $X_{n-1}$ replaced by $X_n$, which means a calculation based on the samples $X_{n+1}$ and $X_n$ corresponding to the next time slot $TS_{n+1}$ of TLC. It means that one is added to the wrong interpolation coefficient $P_{n+1}$=$P_n$+FD lower than zero to have the new interpolation coefficient $P_{n+1bis}$=$P_{n+1}$+1, which is then higher than zero. So $P_{15bis}$=0.98 and $Y_{15}$=(1−$P_{15bis}$)$X_{15}$+$P_{15bis}X_{16}$=0.02$X_{15}$+0.98 $X_{16}$.

Then, as long as $0 \leq P_n \leq 1$, the next $Y_n$ are calculated with the interpolation formula $Y_n$=$X_{n-1}$+$P_n$·($X_n$−$X_{n-1}$) applied to $X_n$=$X_{n+1}$ and to $X_{n-1}$=$X_n$ with $P_n$=$P_{n-1}$+FD beginning with $P_{15bis}$.

In a second embodiment, the degree of the interpolation function F is two:

$$Y_n = C_0 \cdot X_n + C_1 \cdot X_{n-1} + C_2 \cdot X_{n-2}$$

This quadratic interpolation function can be carried out by a 3 coefficients digital filter $C_0$, $C_1$, $C_2$.

For each time slot $TS_n$, the interpolation coefficient $P_n$ is incremented by FD. The value $P_n$ of the interpolation coefficient P is calculated according to formula:

$$P_n = P_{n-1} + FD$$

For $Y_n$, the interpolation function is calculated with:

$$C_0 = \frac{1}{2}P_n^2 - \frac{1}{2}P_n + \frac{1}{8}$$

$$C_1 = \frac{3}{4} - P_n^2$$

$$C_2 = \frac{1}{2}P_n^2 + \frac{1}{2}P_n + \frac{1}{8}$$

Faults are better attenuated by the second embodiment than by the first embodiment. The means and operating described in reference to FIGS. 4 and 5 may also be present in the second embodiment. In other embodiments, the degree of the interpolation function may also be three, four or five and the means and operating described in reference to FIGS. 4 and 5 may also be present in these further embodiments.

After the interpolation, the second data Y obtained from the means 4 is sent to a decimation filter 7. The output 41 of the interpolation means 4 producing the second data Y is connected to the input 71 of the decimation filter 7. Based on the second data Y, the decimation filter 7 produces on its output 72 third digital data A having a third preset sampling frequency $F_3$ lower than the first sampling frequency $F_E$ and a third preset bit resolution BR3 higher than the first bit resolution BR1, i.e. higher than one bit in case of a sigma-delta analog/digital converter 3 having said first one bit resolution BR1. In the above-mentioned case of a sigma-delta analog/digital converter 3 having a first one bit resolution BR1, said third bit resolution BR3 is 16 bits and said second bit resolution BR2 is 24 bits, said third sampling frequency $F_3$ is 2 kHz, with $F_E$=256 kHz for samples X and data Y. The decimation filter 7 has also at least an input 73 for receiving the filtered clock signal FILTLC, which is the clock for input data Y.

The method according to the invention enables to carry out continuous acquisitions using an interpolation without duration limit. The data pipeline is synchronized in the digital decimation filter.

FIG. 6 shows a system having several units 100, called also nodes, each incorporating a data acquisition apparatus 1 associated with one sensor or a group of sensors, wherein each sensor produces data input to its associated sensor. The sensor is shown on FIG. 6 by box 102 but may be inside the housing 101 of each unit 100 or outside the housing 101 of each unit 100. A unit 100 is called a Field Digitilizer Unit (FDU), as unit 100 is provided for a spatial field in which the associated sensor 102 is situated, and the sensors 102 associated to different units 100 are separated by a not null distance, i.e. the spatial field covered by a sensor 102 associated with a unit 100 is different from the spatial field covered by another sensor 102 associated with another unit 100. At least a cable 200 is provided to bring the reference clock REF to the units 100. Cable 200 is for example in the form of a cable extending between the units 100 and has one end 201 connected to the reference clock 6.

Then, the use of a PLL (phase-locked loop), which involves a great hardware requirement for each unit 100, is avoided. Rather than controlling the local clock, defaults of the local clock 2 are measured in each unit 100 and the defaults are digitally compensated by interpolating the samples. The complexity and consumption of the interpolation function become negligible.

Samples X having a high oversampling rate coming from output 11 are synchronized. The sampling clock 2, 20 is gauged in order to determine its exact frequency $F_E$ value based on a reference clock 6 having any known frequency FREF. A simple interpolation is carried out on the data X coming from output 11 in order to make an asynchronous sampling rate conversion.

The invention claimed is:

1. A data acquisition apparatus, comprising:
   a first means providing a series of first digital sampled and dated data (X) at an imperfect sampling frequency ($F_E$) provided by a first local clock (2),
   a second gauging means (50) for measuring a frequency error (FD) of the first local clock (2) in view of a second reference clock (6),
   a third means for correcting the series of first digital sampled and dated data (X) based at least on the measured frequency error (FD),
   characterized in that
   the first means (3) comprises sigma-delta modulation means (3) arranged to produce said series of first digital sampled and dated data (X) sampled at said imperfect sampling frequency ($F_E$) provided by said first local clock (2),
   the third means comprises at least an interpolation means (4) to produce second digital data (Y) based on at least an interpolation of said series of first digital sampled and dated data (X) and compensating with the measured frequency error (FD), and at least a decimation filter (7) for producing third digital data (A) based on said second digital data (Y).

2. The data acquisition apparatus according to claim 1, wherein the first means comprises at least an analog sensor (102) producing analog measurement data and the sigma-delta modulation means (3) is in the form of a sigma-delta analog-digital converter (3) converting said analog measurement data of the sensor (102) into said series of first digital sampled and dated data (X).

3. The data acquisition apparatus according to claim 1, wherein the first means comprises at least a digital sensor having said sigma-delta modulation means for producing said series of first digital sampled and dated data (X).

4. The data acquisition apparatus according to claim 1, further comprising a control means (42) arranged to set said interpolation based on at least said measured frequency error (FD).

5. The data acquisition apparatus according to claim 4, wherein the interpolation means (4) has an interpolation function (F) having a preset fixed degree and at least a parameter ($C_0$, $C_1$, $C_2$), the third means comprises a means arranged to set said parameter ($C_0$, $C_1$, $C_2$) of the interpolation function (F) based on at least said measured frequency error (FD).

6. The data acquisition apparatus according to claim 5, wherein the degree of the interpolation function (F) is lower than six.

7. The data acquisition apparatus according to claim 5, wherein the interpolation function (F) is linear and the control means (42) sets the interpolation function (F) according to interpolation formula for current first sample $X_n$:

$$Y_n = C_0 \cdot X_n + C_1 \cdot X_{n-1},$$

wherein
$C_0 = P_n$
$C_1 = 1 - P_n$
wherein $X_{n-1}$ and $X_n$ are respectively successive first samples (X),
$Y_n$ is the interpolated third data (Y) for $X_{n-1}$ and $X_n$,
wherein the control means (42) calculates a value $P_n$ of an interpolation coefficient (P) according to formula:

$$P_n = P_{n-1} + FD$$

wherein $P_{n-1}$ and $P_n$ are respectively successive values of the interpolation coefficient P and FD is the frequency error.

8. The data acquisition apparatus according to claim 5, wherein the interpolation function (F) has a degree equal to two and the control means (42) sets the interpolation function (F) according to interpolation formula for current first sample $X_n$:

$$Y_n = C_0 \cdot X_n + C_1 \cdot X_{n-1} + C_2 \cdot X_{n-2},$$

wherein $$C_0 = \frac{1}{2}P_n^2 - \frac{1}{2}P_n + \frac{1}{8}$$

$$C_1 = \frac{3}{4} - P_n^2$$

$$C_2 = \frac{1}{2}P_n^2 + \frac{1}{2}P_n + \frac{1}{8}$$

wherein $X_{n-2}$, $X_{n-1}$ and $X_n$ are respectively successive first samples (X),
$Y_n$ is the interpolated third data (Y) for $X_{n-2}$, $X_{n-1}$ and $X_n$,
wherein the third means calculates a value $P_n$ of an interpolation coefficient (P) according to formula:

$$P_n = P_{n-1} + FD$$

wherein $P_{n-1}$ and $P_n$ are respectively successive values of the interpolation coefficient P and FD is the frequency error.

9. The data acquisition apparatus according to claim 7 or claim 8, wherein the control means (42) comprises a means (43, 44) to check whether according to formula $P_n=P_{n-1}+FD$ the value $P_n$ of the interpolation coefficient (P) is higher than or equal to zero and lower than or equal to one, and as long as the interpolation coefficient is higher than or equal to zero and is lower than or equal to one, the control means (42) sets the interpolation function (F) according to interpolation formula for $X_n$ with the value $P_n$ of the interpolation coefficient (P).

10. The data acquisition apparatus according to claim 9, wherein the control means (42) comprises a means (44) to check whether according to formula $P_n=P_{n-1}+FD$ the value $P_n$ of the interpolation coefficient (P) is higher than one for current first sample $X_n$, and if according to formula $P_n=P_{n-1}+FD$ the value $P_n$ of the interpolation coefficient (P) calculated for current first sample $X_n$ is higher than one, then the control means (42) does not use the corresponding interpolated value $Y_n$ calculated according to interpolation formula as third data (Y) for current first sample $X_n$ with $P_n=P_{n-1}+FD$, but produces as third data associated with current first sample $X_n$ a value $Y_n$ calculated according to interpolation formula for current first sample $X_n$ with the value $P_n$ of the interpolation coefficient calculated according to $P_n=P_{n-1}+FD-1$.

11. The data acquisition apparatus according to claim 9, wherein the control means (42) comprises a forecast means (43) to check whether according to formula $P_{n+1}=P_n+FD$ the next value $P_{n+1}$ of the interpolation coefficient (P) for current first sample $X_n$ is lower than zero, and if according to formula $P_n=P_{n-1}+FD$ the value $P_n$ of the interpolation coefficient (P) calculated for current first sample $X_n$ is lower than zero, then the control means (42) produces as third data (Y) the corresponding interpolated value $Y_n$ calculated according to interpolation formula for current first sample $X_n$ with $P_n=P_{n-1}+FD$ and produces as third data (Y) another value calculated according to interpolation formula for current first sample $X_n$ with the value $P_n$ of the interpolation coefficient calculated according to $P_n=P_{n-1}+FD+1$.

12. The data acquisition apparatus according to claim 1, wherein said series of first digital sampled and dated data (X) has a first preset bit resolution (BR1) of at least one and of lower than or equal to four, the second data (Y) has said imperfect sampling frequency ($F_E$) and a second preset bit resolution (BR2) higher than the first bit resolution (BR1), and the third digital data (A) has a third preset sampling frequency ($F_3$) lower than the imperfect sampling frequency ($F_E$) and a third preset bit resolution (BR3) higher than the first bit resolution (BR1).

13. The data acquisition apparatus according to claim 1, wherein a value of the imperfect sampling frequency ($F_E$) is preset to cause an oversampling of a signal provided by at least a sensor according to an oversampling rate OR higher than one, wherein the oversampling rate OR is defined as being equal to:

$$OR = F_E / 2 \cdot F_U.$$

wherein Fu is a highest useful frequency of said signal provided by said sensor.

14. A data acquisition method carried out by calculation means, comprising the steps of:
providing a series of first digital sampled and dated data (X) at an imperfect sampling frequency ($F_E$) provided by a first local clock (2),
measuring a frequency error (FD) of the first local clock (100) in view of a second reference clock (6) by gauging the first local clock (2) in view of the second reference clock (6),
correcting the series of first digital sampled and dated data (X) based at least on the measured frequency error (FD), characterized in that
said series of first digital sampled and dated data (X) sampled at said imperfect sampling frequency ($F_E$) provided by said first local clock (2) is produced by a sigma-delta modulation (3),
said series of first digital sampled and dated data (X) is interpolated to produce second digital data (Y) in order to compensate with the measured frequency error (FD),
said second digital data (Y) is decimated to produce third digital data (A).

* * * * *